US008477264B2

(12) United States Patent
Morito

(10) Patent No.: US 8,477,264 B2
(45) Date of Patent: Jul. 2, 2013

(54) LIQUID CRYSTAL MODULE AND LIQUID CRYSTAL DISPLAY DEVICE

(75) Inventor: Yoshihiro Morito, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/300,332

(22) Filed: Nov. 18, 2011

(65) Prior Publication Data

US 2012/0200798 A1 Aug. 9, 2012

(30) Foreign Application Priority Data

Feb. 4, 2011 (JP) ................. 2011-023367

(51) Int. Cl.
G02F 1/13357 (2006.01)
F21S 2/00 (2006.01)
F21V 8/00 (2006.01)
(52) U.S. Cl.
USPC ............. 349/65; 349/58; 362/612; 362/631; 362/633
(58) Field of Classification Search
USPC ............. 349/58, 65; 362/612, 613, 621, 633, 362/97.2, 97.3, 631
See application file for complete search history.

(56) References Cited

U.S. PATENT DOCUMENTS

| 2009/0316064 A1* | 12/2009 | Kono et al. | 349/58 |
| 2010/0073599 A1 | 3/2010 | Yoon et al. | |
| 2010/0118514 A1 | 5/2010 | Cho et al. | |

FOREIGN PATENT DOCUMENTS

| JP | 2006-251636 | 9/2006 |
| JP | 2008-147091 | 6/2008 |
| JP | 2009-110811 | 5/2009 |
| JP | 2009-245902 | 10/2009 |
| JP | 2010-009845 | 1/2010 |
| JP | 2010-073694 | 4/2010 |
| JP | 2010-118348 | 5/2010 |
| WO | WO 2010/122708 | * 10/2010 |

OTHER PUBLICATIONS

Japanese Patent Application No. 2011-023367, Notification of Reasons for Refusal, mailed Feb. 14, 2012, (with English Translation).

* cited by examiner

Primary Examiner — Dung Nguyen
Assistant Examiner — Tai Duong
(74) Attorney, Agent, or Firm — Blakely, Sokoloff, Taylor & Zafman LLP

(57) ABSTRACT

According to one embodiment, a liquid crystal module includes a transmissive liquid crystal cell, a light source device, a light guide plate and a frame. The light source device includes a plurality of light-emitting elements arranged in a row on a board. The light guide plate includes a light incidence surface on which light emitted from the light source device enters and a light exit surface from which light that has entered the light guide plate through the light incidence surface is output. The frame is configured to hold a peripheral portion of the liquid crystal cell and the light source device and to comprise a first projection projecting from a position close to the light source device toward the light guide plate.

20 Claims, 5 Drawing Sheets

LIQUID CRYSTAL MODULE AND LIQUID CRYSTAL DISPLAY DEVICE

CROSS REFERENCE TO RELATED APPLICATION(S)

This application is based upon and claims the benefit of priority from Japanese Patent Application No. 2011-023367 filed on Feb. 4, 2011, the entire contents of which are incorporated herein by reference.

FIELD

Embodiments described herein relate to a liquid crystal module and a liquid crystal display device.

BACKGROUND

In recent years, flat display devices such as liquid crystal display devices have come to be used widely as image display devices of TV receivers, various computers, etc. because of their advantages that they are low in thickness, weight, and power consumption.

For example, transmissive liquid crystal display devices are equipped with a liquid crystal panel in which a liquid crystal layer is held between a pair of transparent substrates and a surface light source device which is disposed behind the liquid crystal panel (i.e., on the side opposite to an image display screen) and applies light to the liquid crystal panel.

To further reduce the thickness and the size of such liquid crystal display devices, it is necessary to decrease the thickness of the surface light source device further. To this end, side light type (edge light type) surface light source devices (backlights) have come to be employed more than direct light type ones.

Side light type surface light source devices have a linear light source and a thin-plate-shaped light guide plate which is made of an acrylic resin or the like and whose back surface is printed with a scattering pattern. The linear light source is disposed close to one side surface of the light guide plate. Light emitted from the linear light source travels through the light guide plate, is scattered by the scattering pattern of the back surface of the light guide plate, and exits from the liquid-crystal-panel-side main surface of the light guide plate.

Surface light source devices of liquid crystal display devices are increasingly required to be increased in size and decreased in thickness to accommodate size increase and thickness reduction of TV receivers. However, when the size of a surface light source device is increased, it is difficult to maintain its luminance and luminance uniformity and hence to decrease its thickness.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

DETAILED DESCRIPTION

In general, according to one embodiment, a liquid crystal module includes a transmissive liquid crystal cell, a light source device, a light guide plate and a frame. The light source device includes a plurality of light-emitting elements arranged in a row on a board. The light guide plate includes a light incidence surface on which light emitted from the light source device enters and a light exit surface from which light that has entered the light guide plate through the light incidence surface is output. The frame is configured to hold a peripheral portion of the liquid crystal cell and the light source device and to comprise a first projection projecting from a position close to the light source device toward the light guide plate.

Figure 1:
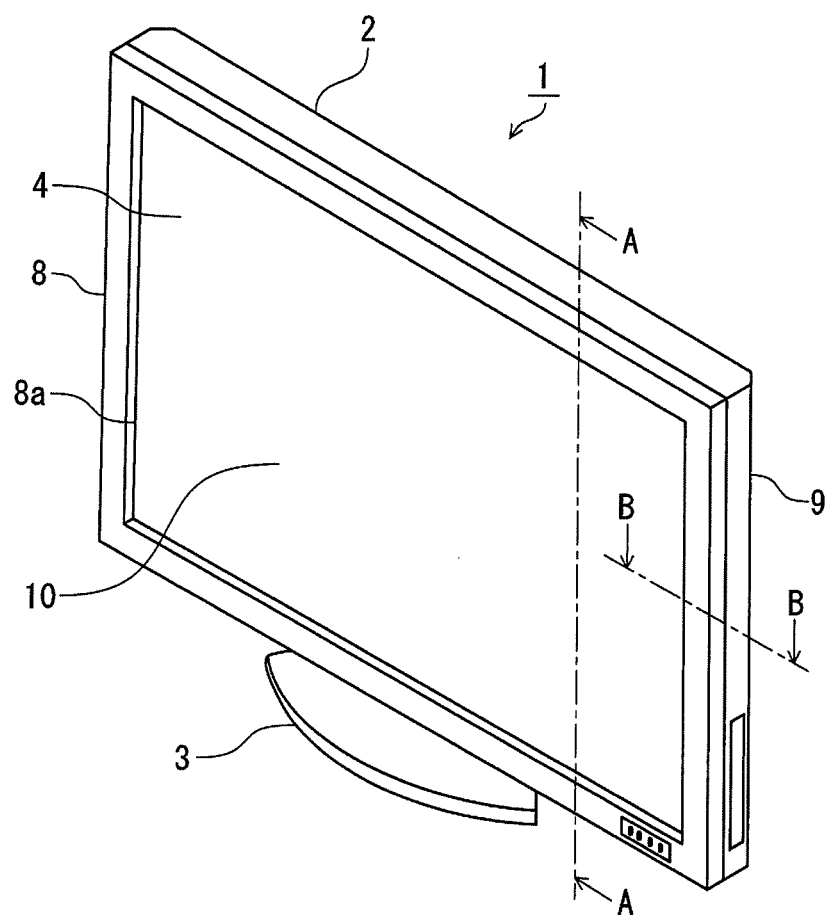
FIG. 1 is an exemplary perspective view showing a general appearance of a liquid crystal display device according to an embodiment.
Figure 2:
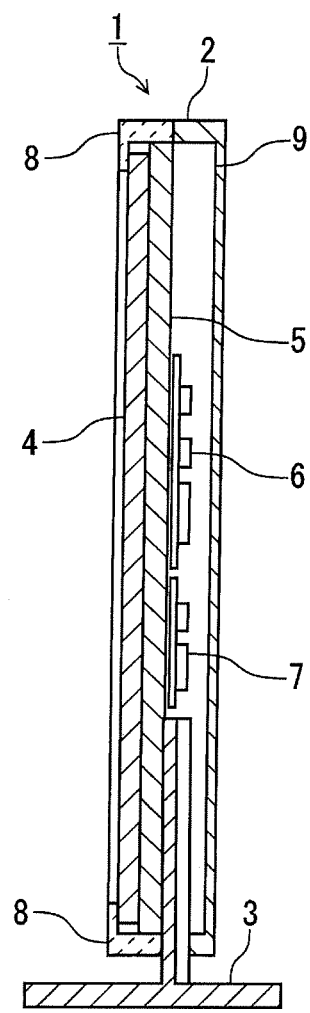
FIG. 2 is an exemplary sectional view of the liquid crystal display device according to the embodiment.

An embodiment will be hereinafter described with reference to the drawings. FIG. 1 is a perspective view showing a general appearance of a liquid crystal display device 1 according to the embodiment. FIG. 2 is a sectional view of the liquid crystal display device 1 according to the embodiment taken along line A-A in FIG. 1. The liquid crystal display device 1 is equipped with a cabinet 2 and a stand 3 which supports the cabinet 2. A liquid crystal module 4 is disposed in the cabinet 2 on the front side, and a chassis 5 which supports the liquid crystal module 4 is also disposed in the cabinet 2 behind the liquid crystal module 4. The chassis 5 is mounted with a circuit board 6 for driving the liquid crystal module 4 and a power circuit board 7.

The outside surfaces of the cabinet 2 are enclosed by a front bezel 8 which covers the front surface, and parts of the top surface, the bottom surface and both side surfaces of the cabinet 2 and a rear bezel 9 which covers the rear surface and the other parts of the top surface, the bottom surface, and both side surfaces of the cabinet 2. A screen 10 is a display portion, located inside a window portion 8a of the front bezel 8, of the liquid crystal module 4.

Figure 3:
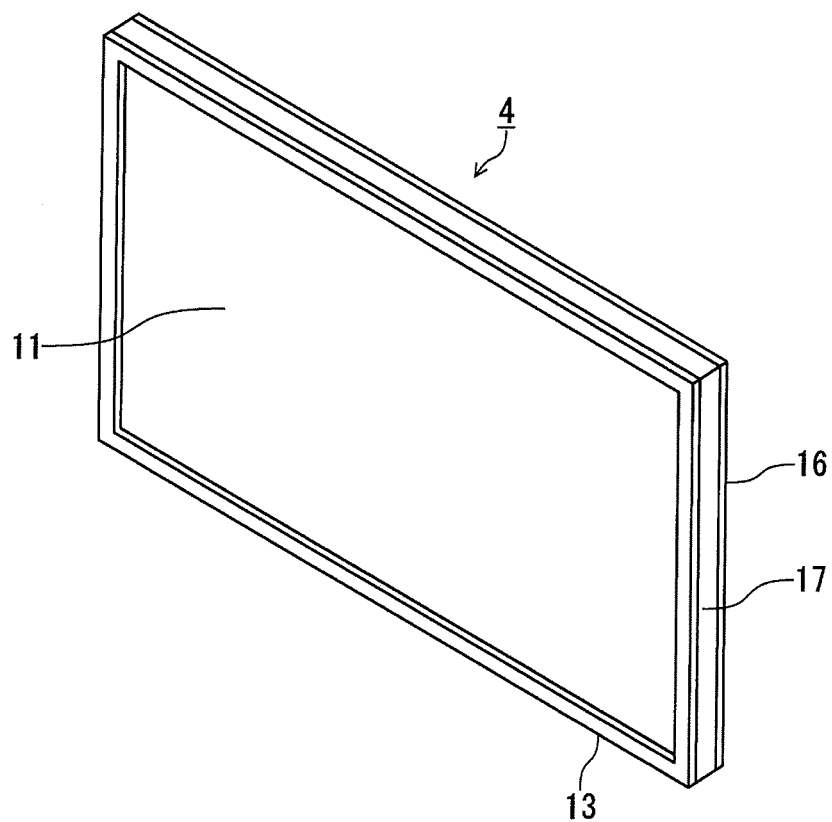
FIG. 3 is an exemplary perspective view showing a general appearance of a liquid crystal module according to the embodiment.
Figure 4:
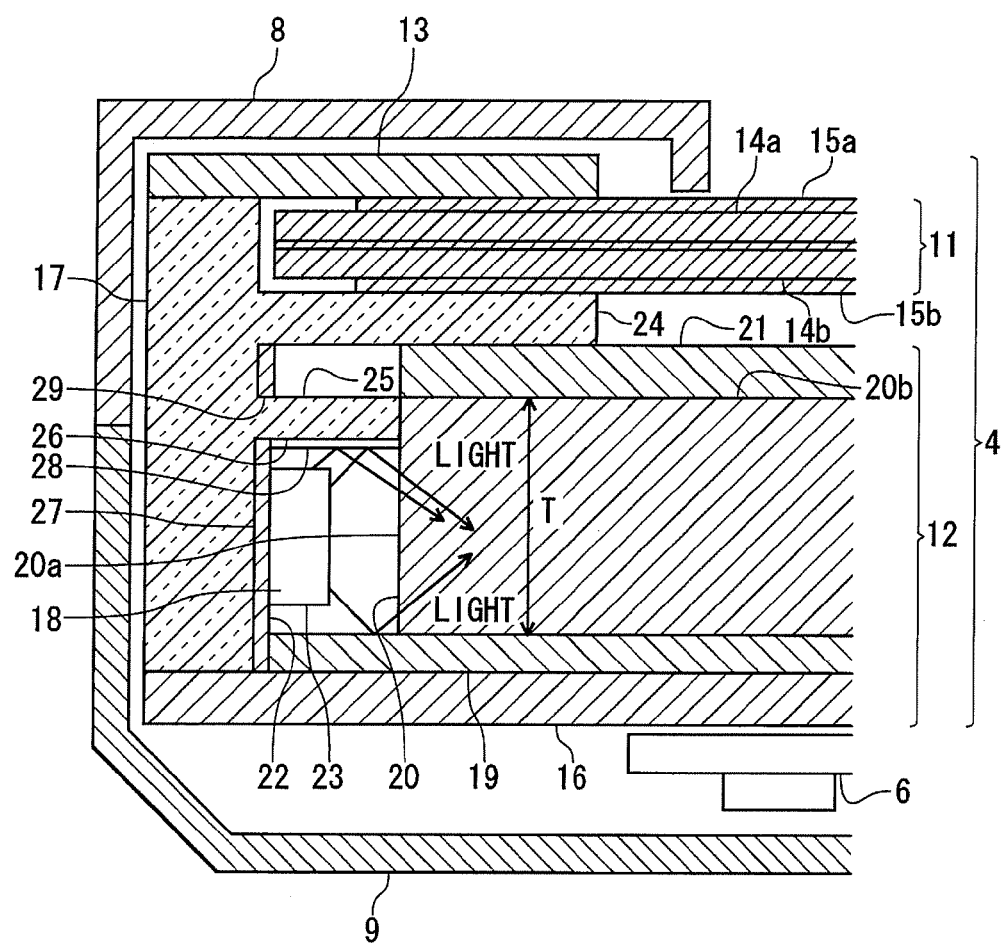
FIG. 4 is an exemplary partial sectional view of the liquid crystal display device according to the embodiment.

FIG. 3 is a perspective view showing a general appearance of the liquid crystal module 4 according to the embodiment. FIG. 4 is a partial sectional view of the liquid crystal display device 1 according to the embodiment taken along line B-B in FIG. 1. The liquid crystal module 4 is composed of a liquid crystal cell 11, a backlight unit 12, and a front cover 13.

The liquid crystal cell 11 is a transmissive liquid crystal panel having a substantially rectangular, flat-plate-like external shape. The liquid crystal cell 11 has a flat structure in which the space between at least two substrates 14a and 14b made of glass or the like is filled with a liquid crystal substance. The interval between the substrates 14a and 14b is usually several micrometers. Polarizing plates 15a and 15b are disposed outside the respective substrates 14a and 14b.

The backlight unit 12 is composed of a back cover 16, a frame 17, a light source device 18, a reflection plate 19, a light guide plate 20, and a diffusion plate 21. The back cover 16 is produced by sheet metal forming or resin molding. The reflection plate 19, the light guide plate 20, the diffusion plate 21, and the frame 17 are assembled on the back cover 16. The light source device 18 is disposed inside the frame 17.

The frame 17 is a frame member produced by resin molding, aluminum extrusion molding, or the like. The frame 17, the front cover 13, and the back cover 16 function as a cabinet of the liquid crystal module 4. The frame 17 is a peripheral frame member of the liquid crystal module 4 and is a main part of the cabinet.

The light source device 18 is a circuit board in which light-emitting elements 23 which are LEDs (light-emitting diodes), for example, are mounted on a light-emitting elements wiring board 22. The light-emitting elements wiring board 22 is a rigid board such as a glass epoxy board or an aluminum board or a flexible wiring board. Each light-emitting element 23 is an LED element having an approximate external size of 6 mm (horizontal)×3 mm (vertical), and multiple LED elements are mounted on the light-emitting elements wiring board 22 at intervals of several centimeters.

The light guide plate 20 has a substantially rectangular, plate-like external shape and is approximately the same as the liquid crystal cell 11 in external size. The light guide plate 20 is a transparent acrylic plate or polycarbonate plate. The light guide plate 20 has a light incidence surface 20a on which light emitted from the light source device 18 enters and a light exit surface 20b from which the light that has entered the light guide plate 20 through the light incidence surface 20a exits. The light guide plate 20 is configured so that light beams that are emitted from the light-emitting elements 23 and enter the light guide plate 20 through the light incidence surface 20a are reflected inside repeatedly and output from the entire light exit surface 20b which is opposed to the rear surface of the liquid crystal cell 11. The light guide plate 20 applies light that originates from the light source device 18 to the rear surface of the liquid crystal cell 11.

The reflection plate 19 is disposed between the light guide plate 20 and the back cover 16. The reflection plate 19 is an optical member which enables effective use of light by reflecting light that is output from the light guide plate 20 toward the reflection plate 19 and thereby returning it to the light guide plate 20. The surface, opposed to the reflection plate 19, of the light guide plate 20 may be coated with a reflective material.

The diffusion plate 21 is placed on the light exit surface 20b of the light guide plate 20. The diffusion plate 21 is an optical member which serves to adjust the traveling directions of light that is output from the light guide plate 20 and to diffuse that light so that the light enters on the rear surface of the liquid crystal cell 11 uniformly.

The frame 17 has a liquid crystal cell holding projection 24. The liquid crystal cell holding projection 24 has roles of adjusting the interval between the diffusion plate 21 and the liquid crystal cell 11 and to position the liquid crystal cell 11 and the backlight unit 12. The front cover 13 is a metal cover having an opening that is approximately the same in shape as the display area of the liquid crystal cell 11. The front cover 13, the frame 17, and the back cover 16 constitute the cabinet of the liquid crystal module 4.

The frame 17 is disposed between the front cover 13 and the back cover 16, the liquid crystal cell 11 is disposed between the liquid crystal cell holding projection 24 and the front cover 13, and the main components of the backlight unit 12 are disposed between the liquid crystal cell holding projection 24 and the back cover 16.

The frame 17 has projections 25 which are located in the vicinity of the light source device 18 and project toward the light guide plate 20 from the side of the light source device 18. The surface, opposed to the light guide plate 20, of the frame 17 is provided with an attachment portion 27 for the light-emitting elements wiring board 22. The projections 25 project toward the light guide plate 20 from the attachment portion 27.

Surfaces 26, opposed to the light-emitting elements 23, of the projections 25 are provided with a light reflection sheet 28. The light reflection sheet 28 has a function of reflecting light beams, which are emitted from the light-emitting elements 23 and do not travel toward the light incidence surface 20a of the light guide plate 20, and thereby causing them to enter the light incidence surface 20a. The light reflection sheets 28 enables efficient use of light beams emitted from the light-emitting elements 23 and can thereby improve the optical characteristics such as luminance and luminance uniformity of the side light type backlight unit 12.

The surfaces 26, opposed to the light-emitting elements 23, of the projections 25 are disposed within the thickness T of the light incidence surface 20a of the light guide plate 20. Therefore, little light leaks out without entering the light incidence surface 20a. The projections 25 project so that their tips are in contact with or close to the light incidence surface 20a. The light reflection sheet 28 extends to the same position as the projections 25 project to, whereby little light leaks out without entering the light incidence surface 20a.

Figure 5:
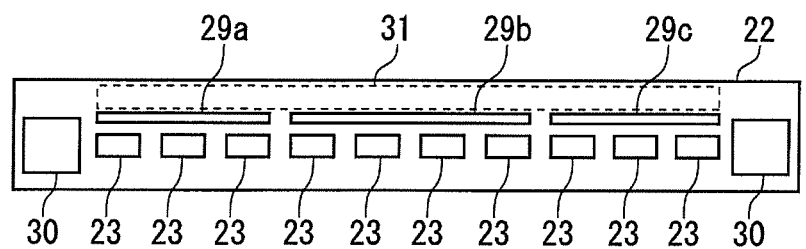
FIG. 5 is an exemplary view showing a general appearance of a light source device according to the embodiment.

FIG. 5 shows a general appearance of the light source device 18. The light source device 18 is configured in such a manner that the multiple light-emitting elements 23 are mounted on the light-emitting elements wiring board 22 so as to be arranged in a row. For example, LED elements are arranged at intervals of several centimeters. Connectors 30 which connect a circuit board for driving the light source device 18 to cables or flexible boards are disposed at both ends of the light-emitting elements wiring board 22.

The light-emitting elements wiring board 22 has slits 29 which are holes through which the projections 25 of the frame 17 pass when the light-emitting elements wiring board 22 is attached to the attachment portion 27 of the frame 17. As shown in FIG. 4, the projections 25 project from the attachment portion 27 of the frame 17 toward the light guide plate 20 through the slits 29.

As shown in FIG. 5, the slits 29 are divisional slits 29a, 29b, and 29c. Therefore, the projections 25 of the frame 17 are also divisional projections. The regions between the slits 29 are used as regions where interconnections for connecting a wiring region 31 (indicated by a broken line) of the light-emitting elements wiring board 22 and the light-emitting elements 23 are formed.

A non-divisional (i.e., single-body) light reflection sheet 28 can be set by attaching it to the projections 25 after the light-emitting elements wiring board 22 has been attached to the attachment portion 27 of the frame 17. This prevents light from leaking out without entering the light incidence surface 20a.

As described above, since the frame 17 is provided with the projections 25 and the surfaces 26, opposed to the light-emitting elements 23, of the projections are provided with the light reflection sheet 28, light beams that are emitted from the light-emitting elements 23 and do not travel toward the light incidence surface 20a of the light guide plate 20 are reflected by the light reflection sheet 28 and enter the light incidence surface 20a. As a result, light beams emitted from the light-emitting elements 23 can be used efficiently and the optical characteristics such as luminance and luminance uniformity of the side light type backlight unit 12 can be improved.

While certain embodiments have been described, these embodiments have been presented by way of example only, and are not intended to limit the scope of the invention. Indeed, the novel apparatus described herein may be embodied in a variety of other forms; furthermore, various omissions, substitutions and changes in the form of the apparatus, described herein may be made without departing from the sprit of the invention. The accompanying claims and their equivalents are intended to cover such forms or modifications as would fall within the scope and sprit of the invention.

What is claimed is:

1. A liquid crystal module comprising:
a transmissive liquid crystal cell;
a board included
a plurality of light-emitting elements arranged in a row in a longitudinal direction thereof, and
a slit arranged in the vicinity of the light-emitting elements;
a light guide plate compromising
a light incidence surface on which light emitted from the light-emitting elements; enter, and
a light exit surface from which the light that has entered through the light incident surface is output,
a frame including a projection
that is inserted into the slit to protrude in a direction of the light guide plate, and
that is provided with a light reflection sheet on a surface, opposed to the light-emitting elements, thereof,
the frame configured to hold a peripheral portion of the liquid crystal cell and the board.

2. The liquid crystal module of claim 1, wherein the surface, opposed to the light-emitting elements, of the projection is located within a thickness of the light incidence surface of the light guide plate.

3. The liquid crystal module of claim 1, wherein the projection is located at such a position that a tip of the projection is in contact with or close to the light guide plate.

4. The liquid crystal module of claim 2, wherein the projection is located at such a position that a tip of the projection is in contact with or close to the light guide plate 5. The liquid crystal module according to claim 1, wherein
the slit is one of a plurality of slits arranged in parallel to the light emitting elements, and
the projection is one of a plurality of projections that protrude from the board in a direction of the light guide plate through the plurality of slits.

6. The liquid crystal module according to claim 2, wherein
the slit is one of a plurality of slits arranged in parallel to the light emitting elements, and
the projection is one of a plurality of projections that protrude from the board in a direction of the light guide plate through the plurality of slits.

7. The liquid crystal module according to claim 3, wherein
the slit is one of a plurality of slits arranged in parallel to the light emitting elements, and
the projection is one of a plurality of projections that protrude from the board in a direction of the light guide plate through the plurality of slits.

8. The liquid crystal module according to claim 4, wherein
the slit is one of a plurality of slits arranged in parallel to the light emitting elements, and
the projection is one of a plurality of projections that protrude from the board in a direction of the light guide plate through the plurality of slits.

9. The liquid crystal according to claim 5, wherein the board comprises interconnections is regions other than the plurality of slits.

10. The liquid crystal module according to claim 1, wherein the frame compromises a liquid crystal cell holding projection configured to hold the peripheral portion of the liquid crystal cell, at a position that is closer to the liquid crystal cell than the projection.

11. A liquid crystal display device comprising:
a transmissive liquid crystal cell;
a board including
a plurality of light-emitting elements arranged in a row in a longitudinal direction thereof and
a slit arranged in the vicinity of the light-emitting elements;
a light guide plate comprising
a light incidence surface on which light emitted from the light-emitting elements enter, and
a light exit surface from which the light that has entered trough the light incidence surface is output,
a frame including a projection
that is inserted into she slit to protrude in a direction of the light guide plate, and
that is provided with a light reflection sheet on a surface, opposed to the light-emitting elements, thereof
the frame configured to hold a peripheral portion of the liquid crystal cell and the board.

12. The liquid crystal display device according to claim 11, wherein the surface, opposed to the light-emitting elements, of the projection is located within a thickness of the light incidence surface of the light guide plate.

13. The liquid crystal display device according to claim 11, wherein the projection is located at such a position that a tip of the projection is in contact with or close to the light guide plate.

14. The liquid crystal device according to claim 12, wherein the projection is located at such a position that a tip of the projection is in contact with or close to the light guide plate.

15. The liquid crystal display device according to claim 11, wherein the slit is one of a plurality of slits arranged in parallel to the light emitting elements, and
the projection is one of a plurality of projections that protrude from the board in a direction of the light guide plate through the plurality of slits.

16. The liquid crystal display device according to claim 12, wherein
the slits is one of a plurality of slits arranged parallel to the light emitting elements, and pg,14
the projection is once of a plurality of projections that protrude from the board in a direction of the light guide plate through the plurality of slits.

17. The liquid crystal device according to claim 13, wherein
the slit is one of a plurality of slits arranged in parallel to the light emitting element, and
the projection is one of a plurality of projections that protrude from the board in a direction of the light guide plate through the of slits.

18. The liquid crystal display device according to claim 14, wherein
the slit is one of a plurality of slits arranged in parallel to the light emitting elements, and
the projection is one of a plurality of projections that protrude from the board in a direction of the light guide plate through the plurality of slits.

19. The liquid crystal display device according to claim 15, wherein the board compromises interconnections in regions other than the plurality of slits.

20. the liquid crystal display device according to claim 11, wherein the frame compromises a liquid crystal cell holding projection configured to hold the peripheral portion of the liquid crystal cell, at a position that is closer to the liquid crystal cell than the projection.

* * * * *